United States Patent [19]
Eyley

[11] Patent Number: 6,093,124
[45] Date of Patent: Jul. 25, 2000

[54] LOCKABLE CHAIN WINDER

[75] Inventor: Brian Eyley, Albany Creek, Australia

[73] Assignee: Lockwood Australian Pty. Ltd., Australia

[21] Appl. No.: 09/141,311

[22] Filed: Aug. 27, 1998

Related U.S. Application Data

[63] Continuation of application No. PCT/AU97/00094, Feb. 20, 1997.

[30]     Foreign Application Priority Data

Feb. 28, 1996 [AU] Australia ................................. PN8316
Dec. 20, 1996 [AU] Australia ................................. PO4276

[51] Int. Cl.[7] .............................. F16H 57/02; F16H 7/24; F16H 7/06; F16D 1/00; G03B 1/04
[52] U.S. Cl. .......................... 474/144; 474/145; 474/150; 474/155; 242/355.2
[58] Field of Search .................... 474/144, 145, 474/146, 148, 150, 155; 242/325.3, 327, 327.4, 350, 355, 355.2

[56]            References Cited

U.S. PATENT DOCUMENTS

| | | | |
|---|---|---|---|
| 4,792,323 | 12/1988 | Flaig | 474/144 |
| 4,801,288 | 1/1989 | Schmitt et al. | 474/144 |
| 5,716,019 | 2/1998 | Ahn | 242/355.1 |

FOREIGN PATENT DOCUMENTS

| | | |
|---|---|---|
| 26009/77 | 12/1978 | Australia . |
| B-59751/80 | 1/1981 | Australia . |
| B-44822/85 | 1/1986 | Australia . |
| B-66028/86 | 6/1987 | Australia . |
| 37098/93 | 11/1993 | Australia . |
| 1.136.948 | 10/1955 | France . |
| 443386 | 2/1936 | United Kingdom . |

*Primary Examiner*—Vinh T. Luong
*Assistant Examiner*—Matthew A. Kaness
*Attorney, Agent, or Firm*—Nixon & Vanderhye P.C.

[57]            ABSTRACT

A lockable chain winder for opening and closing windows has an internal mechanism which includes a stop member (16) which can be moved to engage with the chain winder sprocket (15) in such a manner that the sprocket (15) can freely rotate on one direction, but not in the other direction.

12 Claims, 8 Drawing Sheets

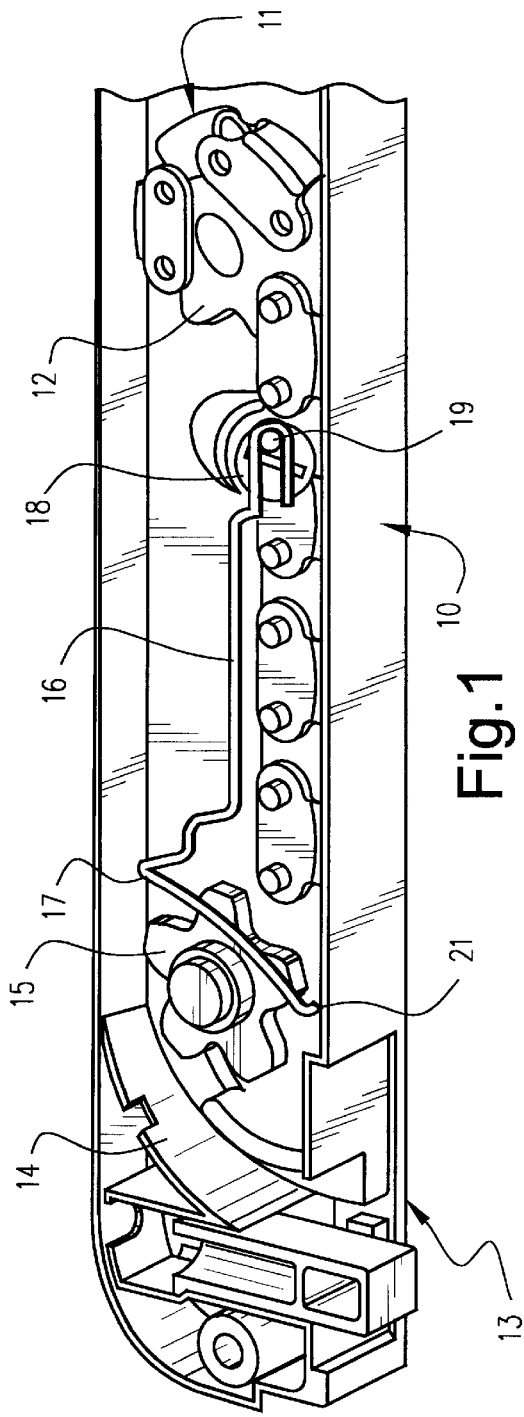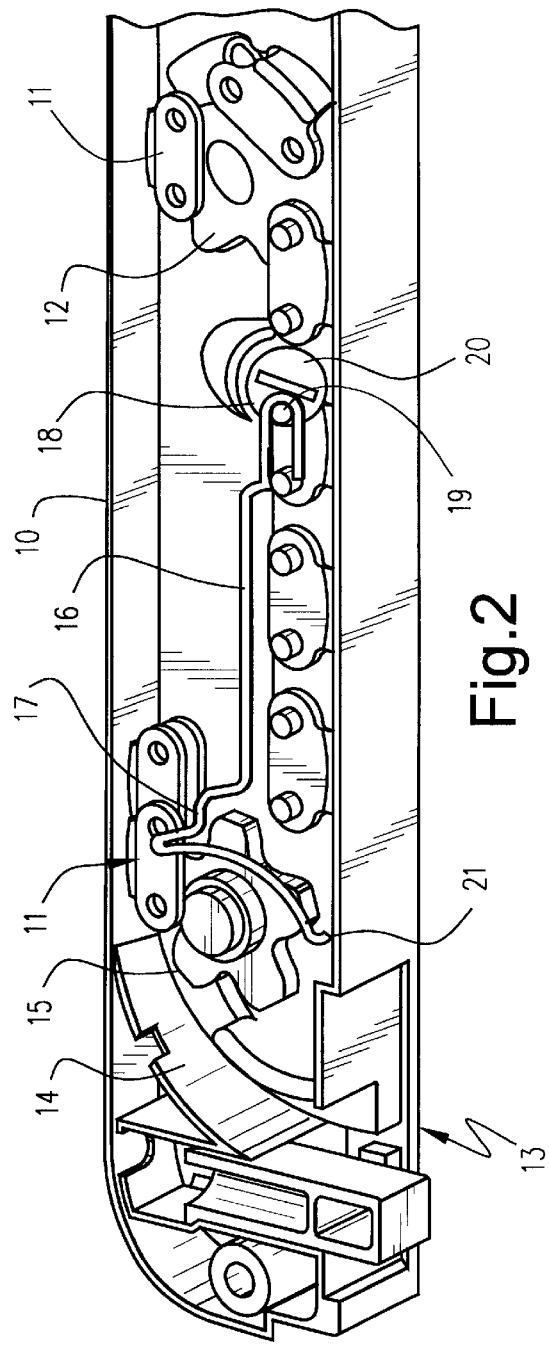

LOCKABLE CHAIN WINDER

This is a continuation of PCT application No. PCT/AU97/00094, filed Feb. 20, 1997.

FIELD OF THE INVENTION

This invention relates to a lockable chain winder which can be used to open and close windows, and particularly relates to a lockable chain winder where the window can be closed without requiring a key.

BACKGROUND ART

Chain winders are well-known and are used to open and close windows which are hinged on a horizontal axis, typically at the top of the window. The advantage of using chain winders is that the chain itself also functions to hold the window in any position without any ability of the window to inadvertently slam to a closed position. Also, the chain winder prevents the window from being further opened, for instance by an intruder.

Known chain winders have a elongate housing in which the chain can be housed. The housing can have an internal curved track along which the chain can move. The housing has an opening through which the chain can pass, and a sprocket is provided in the housing and adjacent the opening. The sprocket has teeth which pass into the chain such that rotation of the sprocket in a forward direction forces the chain out of the housing while rotation of the sprocket in a backward direction forces the chain into the housing.

The sprocket is rotated by an external handle which can be gripped and turned to turn the sprocket and therefore to wind out or wind in the chain From a security point of view it would be advantageous to have a lockable chain winder which can be locked by a key such that a window can be left in a partially open position and can be locked in place. However, a disadvantage with a lockable chain winder is that it is also generally necessary to insert the key to unlock the chain winder to enable the window to be closed. Thus, should it be desired to close the window (for instance, during rain, strong wind or in the evening), it is necessary to find the chain winder key, insert it to unlock the chain winder and then to rotate the handle.

If a number of windows are provided with lockable chain winders, this arrangement becomes unsatisfactory.

OBJECT OF THE INVENTION

The present invention has been developed to provide a lockable chain winder where a window can be closed without a key, that is, the chain can be wound into the housing without a key, but the chain cannot be extended from the housing without a key, if the chain winder is locked.

It is an object of the invention to provide a lockable chain winder which may overcome the abovementioned disadvantages or provide the public with a useful or commercial choice.

In one form, the invention resides in a lockable chain winder comprising a housing in which the chain can be housed, a sprocket in the housing which engages with the chain to drive the chain out of and into the housing upon forward and backward rotation of the sprocket, and a stop member moveable between a first chain locking position, and a second free position, the stop member when in the first position preventing the sprocket from exhibiting forward rotation but still allowing backward rotation, the stop member when in the second free position allowing rotation of the sprocket in both directions.

In this manner, the chain winder can have the stop member in the first chain locking position (and this can be achieved using a key), which will prevent a window from being further opened, but will still allow the window to be closed. If free movement is desired, the stop member can be moved to its second position which will now allow a window to be freely opened or closed with the chain winder.

The housing may be more or less of a conventional type and typically is elongate and can contain an internal track which may be curved and in which the chain can move Adjacent one end of the housing, there may be provided an opening through which the chain can pass.

The sprocket is typically positioned inside the housing and adjacent the opening. The sprocket can be rotatably mounted relative to the housing such that it can rotate in a forward and a backward direction. The sprocket has peripheral teeth and these teeth can pass into the chain links to drive the chain out or into the housing upon rotation of the sprocket.

The stop member may have a portion which in the chain locking position locates between a sprocket tooth and the chain such that the portion prevents the sprocket tooth from passing into the chain. Thus, the sprocket tooth cannot be rotated in a forward direction as it becomes jammed against the portion of the stop member.

This portion can be moved between the chain locking position as described above, and a second free position where the portion is spaced from the sprocket such that the sprocket can now freely pass into the chain to allow it to drive the chain out of the housing.

The stop member can comprise an elongate plate or strip which is located in the housing and which can be moved between its chain locking position and free position. The elongate plate can have a front nose portion which is positioned between adjacent teeth on the drive sprocket when in the locked position which prevents rotation of the drive sprocket in the chain extending position but still allows the drive sprocket to rotate in the other direction. In one form this can be achieved by having the stop member biased into the locked portion but able to be pushed away by the drive sprocket teeth when the sprocket rotates in the other direction.

The stop member can be moved to its free position, and can be held in its free (unlocking) position by a lock button or like member. The lock button can move between, for instance, a depressed position where the stop member is able to move to the chain locking position, and an extended position where the stop member is prevented from moving to the chain locking position.

A key operable lock barrel can be used to manipulate the stop member into a position where the lock button can hold it back against movement towards the chain locking position.

In another alternative, the stop member may comprise an elongate resilient member. The elongate resilient member may comprise a spring clip or spring wire.

The wire may have one end attached somewhere in the housing, and the other end manipulable to move the wire between the chain locking position and the free position.

In one form, this can be achieved by attaching the stop member to an extending projection on a lock barrel such that insertion of a key into the lock barrel and rotation of the key causes rotation of the projection which in turn causes the stop member to move between its first locking position and its second free position.

The lock barrel may be moved without a key between its unlocking position and its locking position. A snib or like member may be provided to assist in movement of the lock barrel to its locking position. It is preferred that when the lock barrel is in its locking position, it cannot be moved to its unlocking position without a key or some other type of member.

BRIEF DESCRIPTION OF THE DRAWINGS

An embodiment of the invention will be described with reference to the following drawings in which FIG. 1 illustrates some internal components of a lockable chain winder having a stop member in the form of a wire and which is in the second free position.

FIG. 2 illustrates the chain winder of FIG. 1 with the stop member in the first locking position.

BEST MODE

Figure 3:
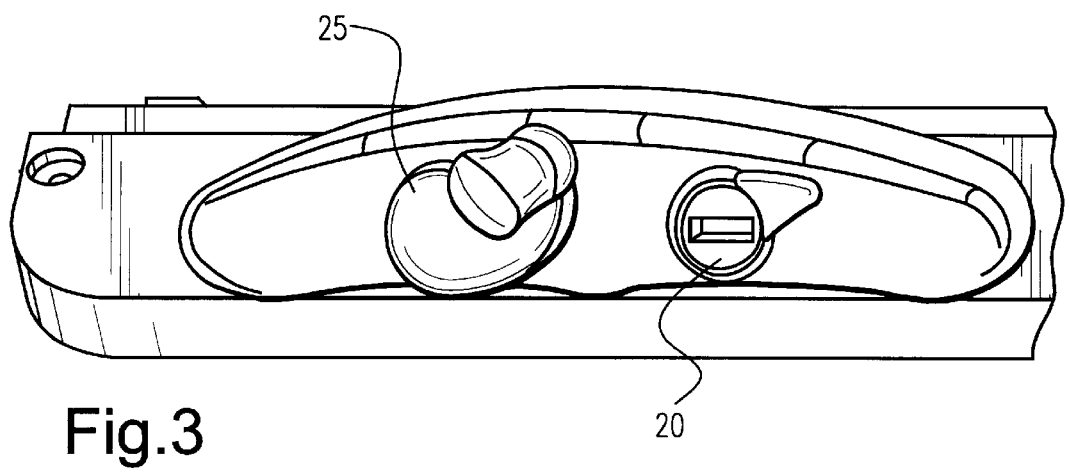
FIG. 3 illustrates the front face of the chain winder.

Referring to FIGS. 1 and 2, there is shown a lockable chain winder with the top removed to allow the internal components to be seen The lockable chain winder has a housing 10 of elongate design. Inside the housing is located a chain 11, and only a portion of the chain is shown for reasons of clarity. Although the chain itself forms no part of the invention, the chain is of a linked arrangement having overlapping portions such that the chain can bend in one direction but not the other direction. Such chains are known.

The chain may be housed within a curved track in the housing, or may be simply placed within the housing with a follower wheel 12 being provided to curve the chain in the housing and to stop the chain from kinking as it curves around.

The housing has an opening 13 through which the chain can pass such that the chain can pass out of and into housing 10 through opening 13. Adjacent opening 13 is a curved plate 14 the function of which is to assist in guiding the chain into the housing and onto the sprocket 15. Sprocket 15 is positioned adjacent opening 13 and has a number of peripheral teeth as illustrated in the drawings. Sprocket 15 is rotatably mounted to housing 10 in such a manner that it can rotate in a forward direction (anti-clockwise) to push the chain out of the housing, and a backward direction (clockwise) to pull the chain into the housing. The teeth of sprocket 15 enter into the chain links to push or pull the chain out of or into the housing.

Sprocket 15 is itself turned by an external handle 25 (see FIGS. 3–5) which is attached to a shaft (not shown) which extends into the housing 10. The shaft is provided with an external spiral thread which engages with the sprocket to turn the sprocket in a forward or backward direction depending on the direction of rotation of the shaft, which in turn depends on the direction of rotation of the handle.

Inside the housing is located a stop member 16. In the embodiment, stop member 16 is a resilient length of spring wire bent into a particular configuration. The configuration of the stop member provides a portion 17 in the wire. This portion is configured and positioned such that when the stop member is in its forward chain locking position illustrated in FIG. 2, portion 17 is positioned between a sprocket tooth and the chain. Thus, the sprocket tooth cannot move in a forward direction to engage with a particular chain link as the leading edge of the sprocket tooth abuts against portion 17

As illustrated in FIG. 1, when the stop member is retracted into its free position, portion 17 is pulled away from sprocket 15 and thus sprocket 15 is free to move in either direction, Referring back to FIG. 2, when the portion 17 is in its forward chain locking position, sprocket 15 cannot move in the forward direction (which in FIG. 2 is in an anticlockwise direction). However, sprocket 15 is still capable of moving in a backward (clockwise) direction, as in this direction the teeth engage into the chain at a position spaced from portion 17, and the teeth merely push away the resilient wire as the sprocket is rotated in the backward direction. Stated differently, portion 17 ratchets over the sprocket teeth as the sprocket teeth move in the backward (clockwise) direction.

Stop member 16 is moved between its locking and its free position by having one end 18 of the stop member attached to a projection 19 extending from lock barrel 20.

In FIG. 1, projection 19 is at one side or lock barrel 20, while in FIG. 2, lock barrel 20 has been rotated such that projection 19 is now at the other side.

Stop member 16 has a second end 21 which is attached to housing 10 at some convenient point. Thus, it can be seen that as lock barrel is rotated and thus projection 19 is moved, the entire stop member will be bent or bowed or pushed in such a manner such that portion 17 is moved from its free position illustrated in FIG. 1 to an engaging position as illustrated in FIG. 2 where it is positioned between a sprocket tooth and the chain.

Figure 4:
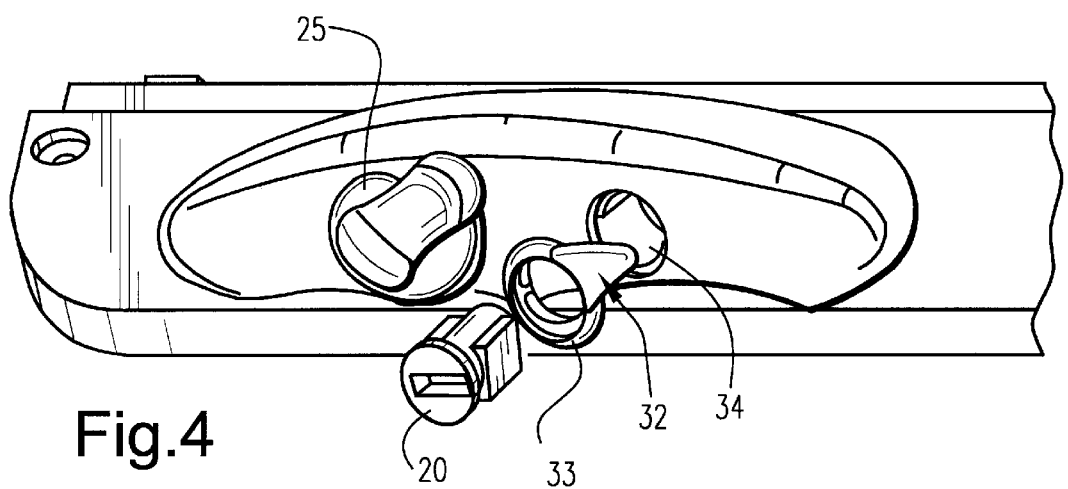
FIG. 4 illustrates an exploded view of some components on the front face.
Figure 5:
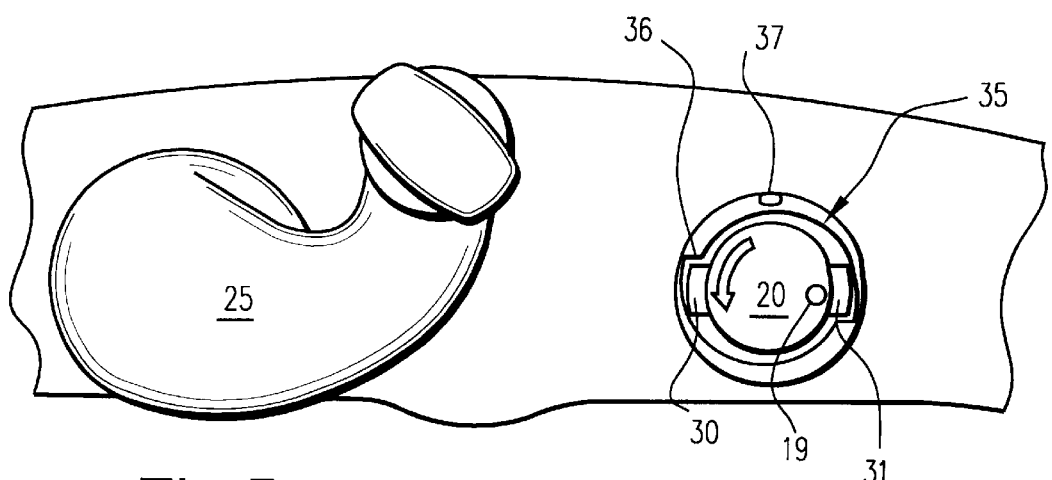
FIG. 5 illustrates some internal features of the lock part of the chain winder.

Referring to FIGS. 3, 4 and 5, there is shown an arrangement whereby lock barrel 20 can be moved or rotated from its unlocking position to its locking position without requiring a key. FIG. 4 shows a partially exploded view illustrating a disc tumbler lock 20 which is characterised by having a number of spring loaded discs 30, 31 and which are more clearly illustrated in FIG. 5. Discs 30,31 are spring loaded and can be pushed into lock body 20, but are naturally biased out of lock body 20.

As illustrated in FIG. 4, around lock body 20 is a snib 32. Snib 32 has an annular collar 33 which fits around lock body 20 and a small lever which can be pushed by a person's finger or thumb. Rotation of snib 32 causes rotation of lock body 20. FIG. 3 shows the assembled arrangement of lock body 20 and snib 32 and it can be seen that a neat arrangement is provided.

The rear of lock body 20 has projection 19 which is illustrated more clearly in FIGS. 1 and 2 (FIG. 5 also shows projection 19 but it should be appreciated that this projection extends into the lock housing and is illustrated in FIG. 5 for convenience only).

Discs 30, 31 are diametrically opposed and extend outwardly from lock body 20 and are illustrated in FIG. 5.

Lock body 20 extends into a bore 34 which is part of the chain winder housing. Inside bore 34 is a ramped surface 35 which is illustrated in FIG. 5. The function of ramped surface 35 is to push discs 30, 31 into lock body 20 when lock body 20 is rotated in an anti-clockwise direction by snib 32. When this occurs, projection 19 moves from one side of the lock body to the other side (because of the rotation of lock body), and this in turn moves the stop member from its free position to its locked position. Thus, it can be seen that snib 32 can function to lock the chain winder without requiring a key.

When in the locked position, snib 32 has been rotated, and has in turn rotated lock body 20 through 180°, and at this position, discs 30,31 can again spring out to their full extent and extend to behind a shoulder 36. Thus, it is now not possible to rotate the lock body back in a clockwise direction to unlock the chain winder. This can only be done by now inserting a key into the lock body, turning the key to retract discs 30,31 and then rotating lock body 20 back to its unlocked position. A stop member 37 is provided to prevent lock body 20 from rotating 360°. Thus, lock body 20 can only be rotated 180° and then a key must be inserted to rotate the lock body back to its unlocked position.

In practice, this means that in the event that the chain winder must be quickly locked, it is only necessary to rotate snib 32, and a key is not required. To unlock the chain winder, a key is required.

Referring to FIGS. 6–11, there is shown a second embodiment of the invention wherein the stop member is formed from a metal plate as opposed to a resilient wire. Referring to the figures, there is again shown a lockable chain winder with the top removed to allow the internal component to be better seen. Lockable chain winder has a housing 40 of elongate design. Inside housing 40 is located a chain 41 and only part of the chain is shown for reasons of clarity Although the chain itself forms no part of the invention, the chain is of a linked arrangement having overlapping portions such that the chain can bend in one direction but not in the other direction. Such a chain is known.

Chain 41 can be retracted inside housing 40 and occupies a track inside but around the periphery of the housing. Again, how the chain is positioned within the housing forms no part of the invention.

Housing 40 has an opening 42 through which the chain can pass such that the chain can pass out of and into housing 40 through the opening. Adjacent opening 42 is a curved plate 43 the function of which is to guide the chain 41 into the housing and onto sprocket 44

Sprocket 44 is mounted for rotation about its axis and is positioned adjacent opening 42. The sprocket has a number of peripheral teeth as illustrated in FIGS. 6–11 and is able to rotate in a forward direction (anti-clockwise) to push the chain out of the housing, and a rearward direction (clockwise) to pull the chain into the housing. The teeth of the sprocket 44 enter into the chain links to push or pull the chain in the required direction.

Sprocket 44 is itself rotated by an external handle 45 which is attached to a shaft (not shown) which extends into the housing. The shaft is provided with an external spiral thread which engages with the sprocket to turn the sprocket in a forward or backward direction depending on the direction of rotation of the handle.

Inside housing 40 is located a stop member which, in this embodiment, is in the form of a moving locking plate 46. Locking plate 46 has a forward nose portion 47 and a rear portion 48. Locking plate 46 is spring biased by spring 49 (visible in FIG. 7) which functions to push locking plate 46 into engagement with sprocket 44. That is, locking plate 46 has a natural bias towards the chain locking position where sprocket 44 is prevented from rotating in an anti-clockwise direction.

Figure 6:
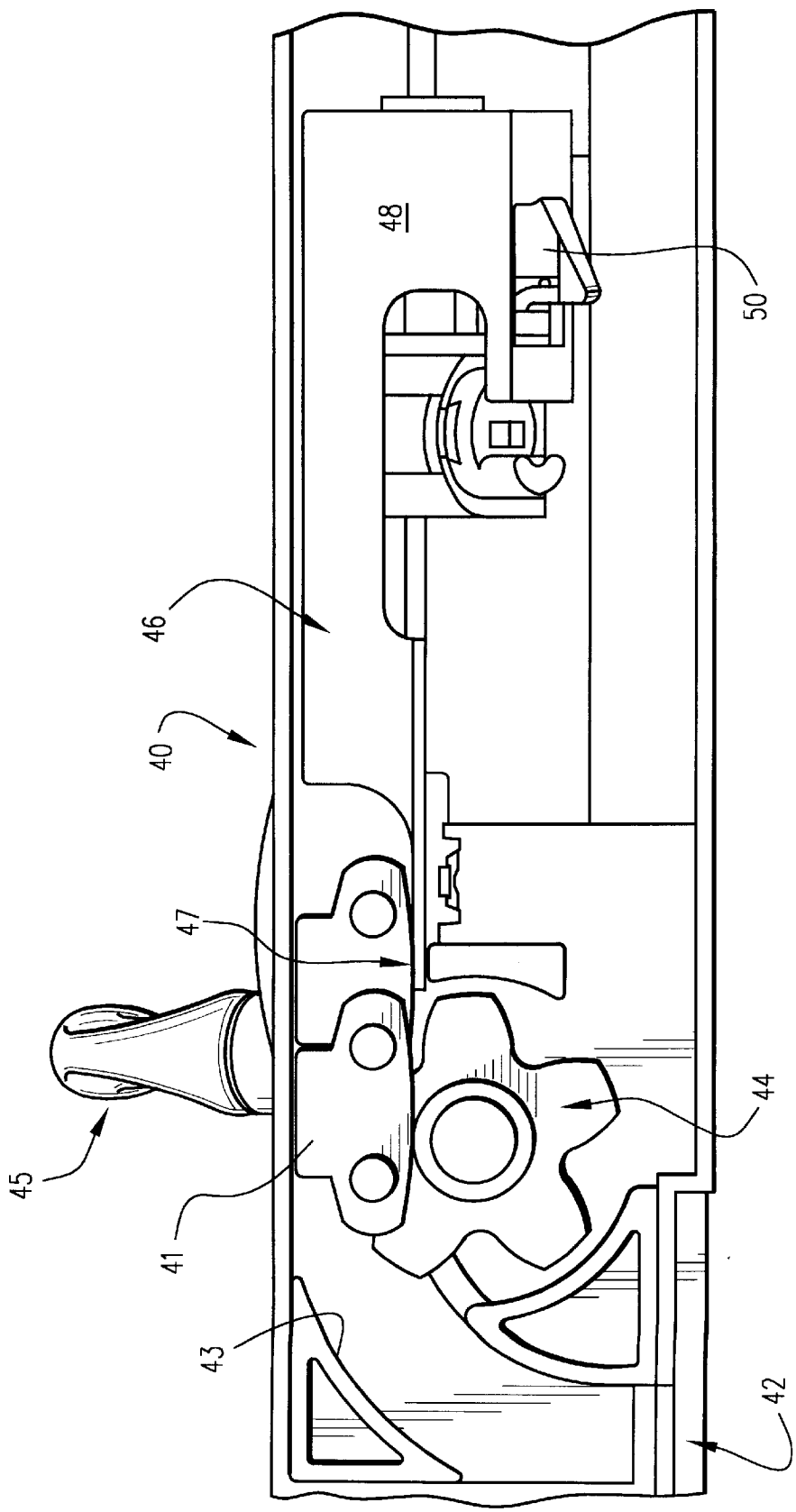
FIG. 6 illustrates a chain winder having a plate like stop member which is in the chain unlocked position.

Initially, as illustrated in FIG. 6, locking plate 46 is in a retracted position whereby sprocket 44 is free to rotate in either direction. In the retracted position, the chain is free to be wound into and out of housing 40.

Locking plate 46 is kept in the retracted position by a lock button 50 which will be described in greater detail below.

Figure 7:
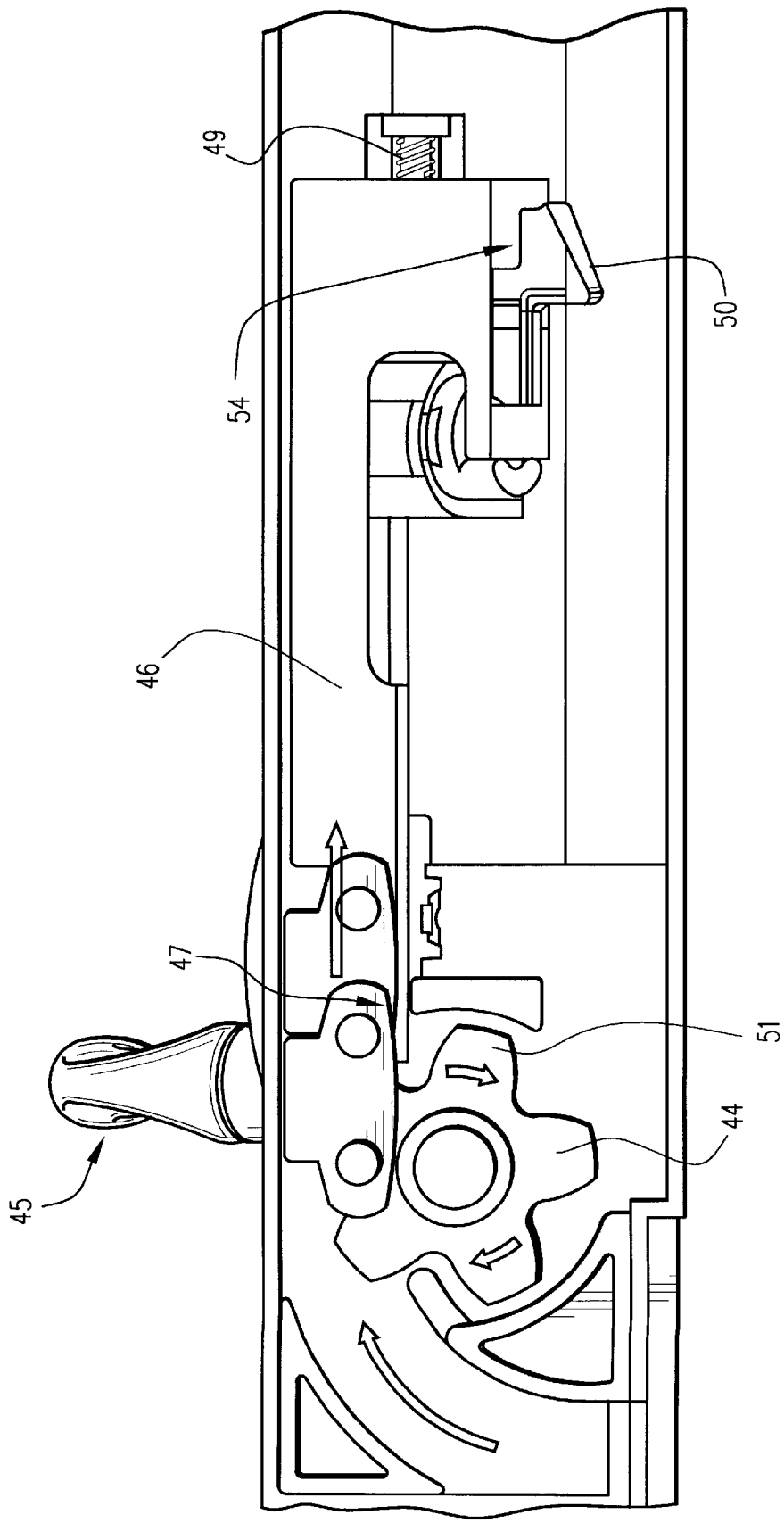
FIG. 7 illustrates the chain winder of FIG. 6, wherein the stop member is in the chain locking position.

Referring now to FIG. 7, there is shown the locking plate 46 now in its forward chain locking position. In this position, locking place 46 has been biased towards sprocket 44 by spring 49 such that nose portion 47 is positioned between adjacent teeth of sprocket 44. Rotation of sprocket 44 in an anti-clockwise direction (that is to extend the chain from the housing), is prevented as sprocket tooth 51 will strike nose portion 47 and will be prevented from further anti-clockwise rotation.

Figure 8:
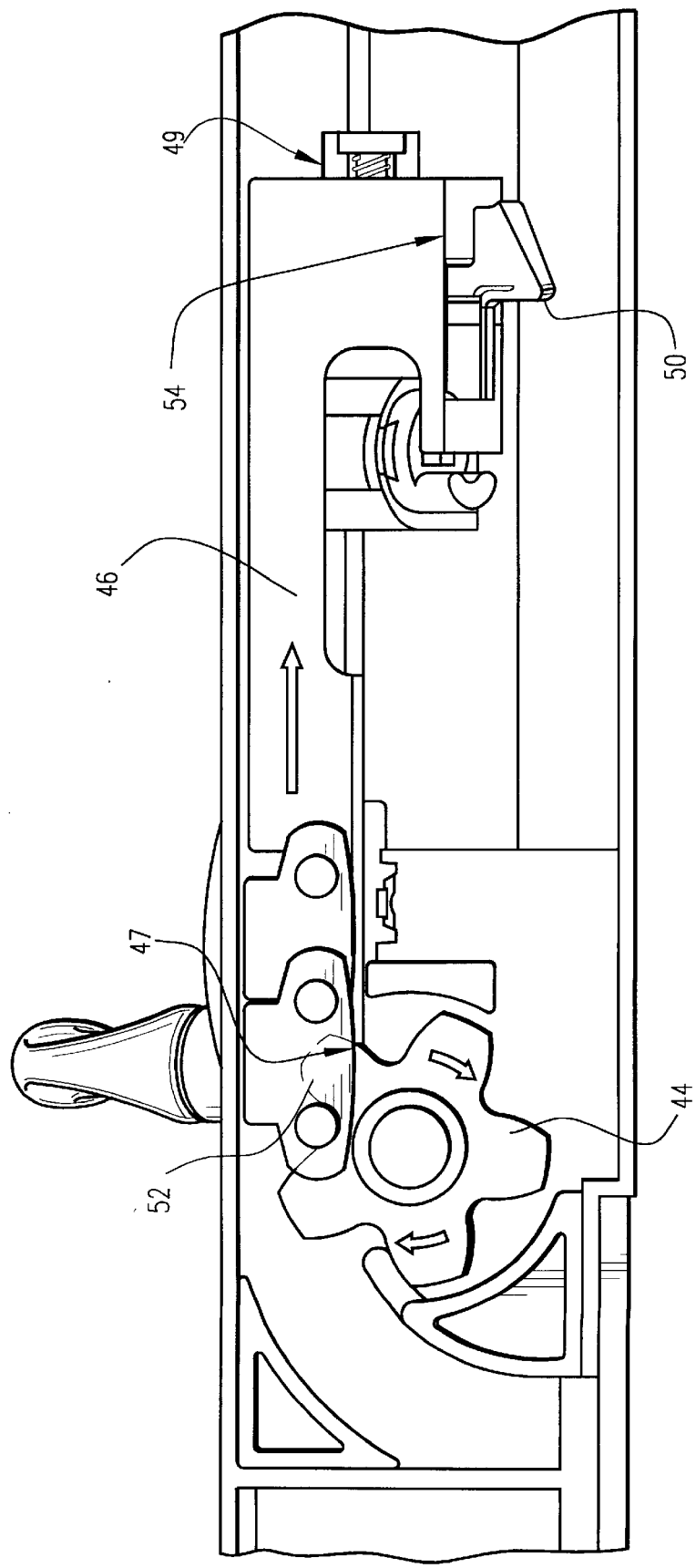
FIG. 8 illustrates the ability of the sprocket tooth to push back the stop member of FIGS. 6 and 7
Figure 9:
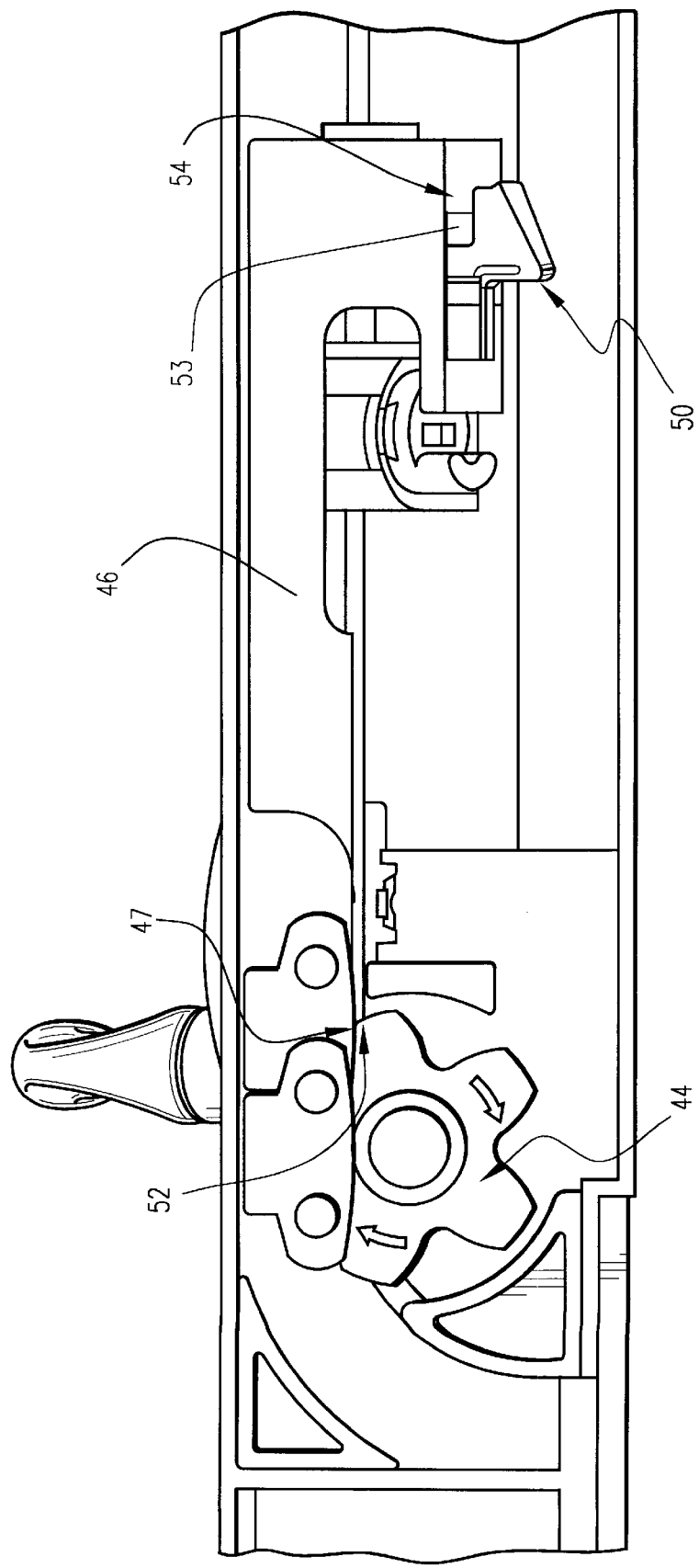
FIG. 9 shows the sprocket tooth of FIG. 6 fully pushing back the stop member.

However, as illustrated in FIGS. 8 and 9, sprocket 44, while not being able to move in an anti-clockwise direction, is able to move in a clockwise direction (that is to pull the chain into the housing). As sprocket 44 moves in a clockwise direction, a sprocket tooth 52 abuts against nose portion 47 and nose portion 47 rides along the periphery of sprocket tooth 52. Thus, as sprocket 44 continues to rotate in a clockwise direction, sprocket tooth 54 progressively results in locking plate 46 being pushed backwardly.

FIG. 8 shows nose portion 47 beginning to ride along the periphery of tooth 52 and FIG. 9 shows nose portion 47 at its furthest pushed back position where it is now on the uppermost portion of sprocket tooth 52.

Referring to FIG. 9, as sprocket 44 continues its clockwise rotation, sprocket tooth 52 will move downwardly which will cause locking plate 46 to now be pushed back into its forward locking position by spring 49.

Thus, sprocket 44 can continue to rotate in a clockwise direction to pull the chain into the housing, and as the sprocket rotates, locking plate 46 is caused to reciprocate between its retracted and extended position.

Lock button 50 does not prevent locking plate 46 from exhibiting reciprocating motion. Lock button 50 has a recess or slot 53 into which a rear portion 54 of locking plate 46 can pass.

When locking plate 46 is in the extended position as illustrated in FIG. 7, rear portion 54 sits within recess 53. As locking plate 46 is progressively retracted by virtue of nose portion 47 riding over lock tooth 52, rear portion 54 is progressively moved out of recess 53. It is however important to note that when locking plate 46 is in its most retracted position (as illustrated in FIG. 9), rear portion 52 is not entirely out of recess 53.

Lock button 50 is spring biased to naturally adopt an extended position While rear portion 54 is within recess 53, lock button So is in its depressed position and cannot spring out to its extended position. Thus, while locking plate 46 reciprocates by virtue of nose portion 47 riding over the sprocket teeth, lock button 50 is maintained in its depressed position against the bias of its spring (the spring not being shown). If it is desired to unlock the chain winder such that sprocket 44 can freely move in both direction, lock button 50 is caused to spring out to its extended position and, in doing so, holds back locking plate 46 into the position illustrated in FIG. 11 where nose portion 47 is clear of the sprocket teeth such that the sprocket teeth can rotate both clockwise and anti-clockwise.

Figure 10:
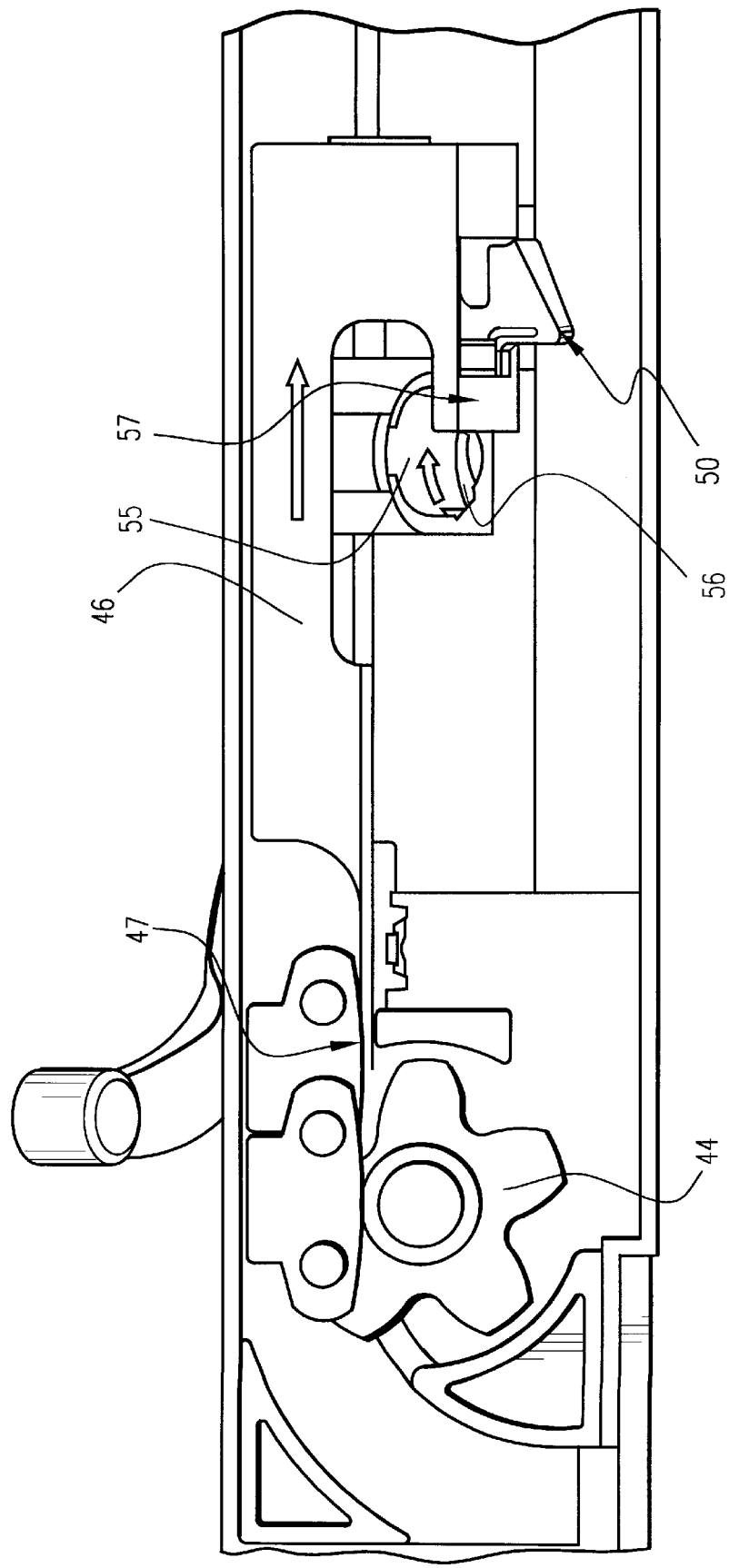
FIG. 10 illustrated the ability of the lock barrel to push the stop member of FIGS. 6–9 back to a position where the lock button holds back the stop member.
Figure 11:
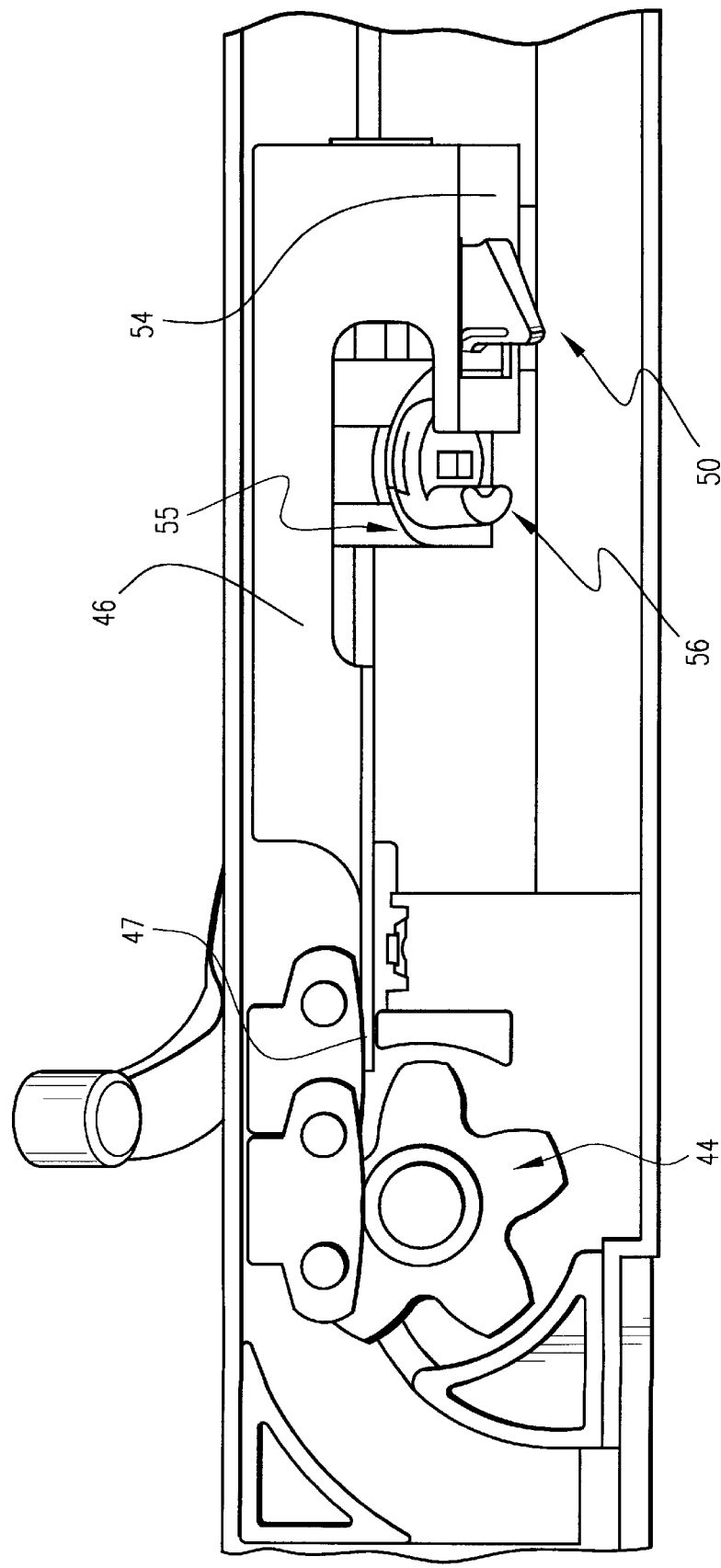
FIG. 11 shows the chain winder of FIGS. 6–10 in the unlocked position where the sprocket can rotate in either direction.

This is achieved by rotating lock cylinder 55 from its position shown in FIG. 11 to its position shown in FIG. 10 In the position shown in FIG. 10 lock cylinder 55 has been rotated such that a camming edge 56 abuts against locking plate 46 at 57 and pushes locking plate 46 backwards against the bias of its spring far enough to cause rear portion 54 to pass entirely out of recess 53. As soon as this occurs, lock button 50 springs to its extended position where rear portion 54 and recess 53 are no longer aligned. Thus, locking plate 46 can now not move back into its locking position, until lock button 50 is depressed to re-align rear portion 54 and recess 53. Upon depression of the lock button, the locking plate 46 can now again move into engagement with sprocket 44.

Depression of lock button 50 to release locking plate 46 can only occur if lock 55 has been rotated back to the position illustrated in FIG. 11. Thus, when the lock has been rotated as illustrated in FIG. 10, depression of button so will still not result in release of locking plate 46.

It can be seen that this arrangement is simple in design and efficient in operation. The arrangement prevent sprocket 15 from pushing out the chain when the stop member is in its chain locking position, but in this position the chain can still be wound into the housing. In the free position, sprocket 15 is not encumbered and can rotate in either direction.

It should be appreciated that various other changes and modifications can be made to the embodiment described without departing from the spirit and scope of the invention.

What is claimed is:

1. A lockable chain winder comprising a housing in which a chain is housed, a sprocket in said housing having teeth which engage with said chain to drive said chain out of and into said housing upon forward and backward rotation of said sprocket, respectively, and a stop member moveable between a first chain locking position, and a second free position, said stop member having a portion which, when said stop member is in said first chain locking position, is located between adjacent sprocket teeth thus preventing said sprocket from rotating in a forward direction but still allowing said sprocket to rotate in a backward direction, said stop member when in the second free position allowing rotation of said sprocket in both said forward and backward directions.

2. The winder of claim 1, wherein said portion of said stop member prevents said sprocket teeth from passing into the chain.

3. The winder of claim 2, wherein said portion of said stop member is moveable between said chain locking position and said second free position where said portion is spaced from said sprocket such that said sprocket is able to pass into said chain to allow it to drive said chain out of housing.

4. The winder of claim 3, wherein said stop member comprises an elongate strip which is located in said housing and which can be moved between said first chain locking position and said second free position, said strip having a leading nose portion which is positioned between adjacent teeth on said sprocket when in said first chain locking position which prevent rotation of said sprocket in said forward direction but still allows rotation of said sprocket in said backward direction.

5. The winder of claim 4, wherein the stop member is biased into said first locking position, and when in said first locking position, is able to be pushed away by said drive sprocket teeth when the sprocket rotates in said backward direction.

6. The winder of claim 5, wherein said stop member can be held in said second free position by a lock member.

7. The winder of claim 6, wherein said lock member is moveable between one position where said stop member is able to move to said first chain locking position, and another position where said stop member is prevented from moving to said first chain locking position.

8. The winder of claim 7, and further comprising a key operable lock barrel mounted on said housing for manipulating said stop member into said one and said another positions.

9. The winder of claim 8, wherein said stop member is an elongate metal plate.

10. The winder of claim 9, wherein said housing is elongate and contains an internal track which is curved and along which said chain moves, said housing having an opening through which said chain passes, said sprocket being positioned inside said housing and adjacent said opening, said sprocket being rotatably mounted relative to said housing such that said sprocket can rotate in said forward and backward directions.

11. The winder of claim 8, wherein said stop member is a resilient wire.

12. The winder of claim 10, wherein the housing is elongate and contains an internal track which is curved and along which the chain moves, the housing having an opening through which the chain passes, the sprocket being positioned inside the housing and adjacent the opening, the sprocket being rotatably mounted relative to the housing such that it can rotate in a forward and a backward direction, the sprocket having peripheral teeth which can pass into the chain links to drive the chain out of or into the housing upon rotation of the sprocket.

* * * * *